(12) United States Patent
Welch et al.

(10) Patent No.: US 6,575,138 B2
(45) Date of Patent: Jun. 10, 2003

(54) DIRECTLY ACTUATED INJECTION VALVE

(75) Inventors: Alan B. Welch, Vancouver (CA); Irawan Rahardja, Vancouver (CA); Mike Hebbes, Vancouver (CA)

(73) Assignee: Westport Research Inc., Vancouver (CA)

( * ) Notice: Subject to any disclaimer, the term of this patent is extended or adjusted under 35 U.S.C. 154(b) by 107 days.

(21) Appl. No.: 09/863,187

(22) Filed: May 23, 2001

(65) Prior Publication Data

US 2001/0032612 A1 Oct. 25, 2001

Related U.S. Application Data (63) Continuation-in-part of application No. 09/522,130, filed on Mar. 9, 2000, now Pat. No. 6,298,829.
(60) Provisional application No. 60/159,791, filed on Oct. 15, 1999.

(51) Int. Cl.[7] .............................................. F02M 55/02
(52) U.S. Cl. ........................................ 123/467; 123/498
(58) Field of Search ................................. 123/498, 467, 123/472, 478; 239/533.2, 533.9, 102.2, 585.1; 251/129.06

(56) References Cited

U.S. PATENT DOCUMENTS

| | | | |
|---|---|---|---|
| 2,721,100 A | * 10/1955 | Bodine, Jr. | .................. 239/99 |
| 4,158,368 A | 6/1979 | Clark | ...................... 137/487.5 |
| 4,725,002 A | 2/1988 | Trachte | .................... 239/102.2 |
| 4,750,706 A | * 6/1988 | Schlagmuller | ......... 251/129.06 |
| 4,813,601 A | 3/1989 | Schwerdt et al. | .............. 239/91 |
| 5,031,841 A | 7/1991 | Schafer | ....................... 239/585 |
| 5,035,360 A | 7/1991 | Green et al. | ................ 239/585 |
| 5,630,550 A | * 5/1997 | Kurishige et al. | ........ 239/533.8 |
| 5,697,554 A | 12/1997 | Auwaerter et al. | ........... 239/88 |
| 5,779,149 A | 7/1998 | Hayes, Jr. | .................... 239/124 |
| 5,819,710 A | 10/1998 | Huber | ........................ 123/498 |
| 5,845,852 A | 12/1998 | Waldman et al. | ........ 239/533.8 |
| 5,875,764 A | 3/1999 | Kappel et al. | .............. 123/467 |
| 6,062,533 A | 5/2000 | Kappel et al. | ................. 251/57 |
| 6,311,950 B1 | * 11/2001 | Kappel et al. | ......... 251/129.06 |
| 6,313,568 B1 | * 11/2001 | Sullivan et al. | ............. 310/346 |

FOREIGN PATENT DOCUMENTS

| | | |
|---|---|---|
| DE | 197 27 992 | 1/1999 |
| EP | 0 869 278 | 8/1998 |
| GB | 2 321 501 | 7/1998 |
| JP | 09-324723 | 12/1997 |
| JP | 10-009084 | 1/1998 |
| WO | WO 85/02445 | 6/1985 |

* cited by examiner

Primary Examiner—Mahmoud Gimie
(74) Attorney, Agent, or Firm—McAndrews, Held & Malloy, Ltd.

(57) ABSTRACT

A directly actuated injection valve comprises a hollow valve housing, a valve member disposed within the hollow interior, a biasing mechanism, an actuator assembly and a passive hydraulic link assembly. The valve member is movable between a closed position and an open position for governing the flow of fuel into the combustion chamber of an internal combustion engine. The biasing mechanism, preferably a spring, biases the valve member in the closed position. The actuator assembly generates an opening force that acts against the valve spring to open the valve. The hydraulic link assembly is interposed between the valve member and the valve spring and the actuator assembly. The hydraulic link assembly transmits respective closing and opening forces to the valve member. The hydraulic link preferably comprises a piston disposed within a cylinder that is filled with a hydraulic fluid.

41 Claims, 5 Drawing Sheets

FIG. 4

DIRECTLY ACTUATED INJECTION VALVE

CROSS-REFERENCE TO RELATED APPLICATION(S)

This application is a continuation-in-part of U.S. patent application Ser. No. 09/522,130 filed Mar. 9, 2000, entitled "Directly Actuated Injection Valve", now U.S. Pat. No. 6,298,829 issued Oct. 9, 2001. The '130 application relates to and claims priority benefits from U.S. Provisional Patent Application Serial No. 60/159,791 filed Oct. 15, 1999, entitled "Directly Actuated Injector". The '130 application and the '791 application are each incorporated herein by reference in their entirety.

FIELD OF THE INVENTION

The present invention relates generally to high pressure fuel injection valves or injectors for internal combustion engines, and, more specifically, to an injection valve that is directly controllable by a position actuating material (such as, for example, a piezoelectric or magnetostrictive material) and which includes a passive hydraulic link.

BACKGROUND OF THE INVENTION

Direct injection of a gaseous fuel into the combustion chamber of an internal combustion engine is desirable for several reasons. For example, direct injection allows charge stratification, eliminating throttling losses associated with homogeneous charge engines. Additionally, with direct injection late in the compression stroke, a high-compression ratio can be maintained, maintaining efficiency. Further, when the fuel that is directly injected comprises natural gas, propane, or hydrogen, the emissions of $NO_x$ and particulate matter (PM) are significantly reduced. The directly injected gaseous fuel can be ignited with a glow plug, with a spark plug, with pilot diesel fuel, or with any other energy source. The gaseous fuel should be injected at high pressure to overcome the combustion chamber pressure, which is high at the end of the compression stroke. Preferably, the injection pressure is high enough to promote good mixing between the injected fuel and the combustion chamber air.

Direct injection at high pressures presents several challenges. The use of high-pressure fuels for direct injection results in high fuel pressures existing within the injection valve or injector. As a result, when closed, the injection valve should typically be strongly seated to avoid leakage of the fuel into the combustion chamber between injection events. When the valve is a needle valve, the valve is seated when the sealing surfaces of the movable valve needle and the valve seat are in fluid-tight contact with each other. The valve seat is generally part of the valve housing or body. For an outward opening valve, such as a poppet valve, the valve is closed when a valve member is retracted within the valve body so that the sealing surfaces of the valve member are pressed against the valve seat to form a fluid-tight seal. A fuel injection valve with an "outward" opening configuration is defined herein as an injection valve for an internal combustion engine which employs a valve member that is movable in the direction of the engine combustion chamber to an open position and in the opposite direction to a closed position. Terms used to describe such a valve member include, for example, pintle shaft, valve stem, and valve shaft. Outward opening injection valves typically comprise a circular valve head mounted transversely on the valve member for axial motion towards and away from a mating circular valve seat associated with the valve body.

Moreover, compared to low-pressure systems, higher forces are needed to open or close the injection valve. For example, for a needle valve that employs an inwardly opening valve needle, when the needle is in the open position it may be subjected to high forces from the pressurized fuel. Conversely, with an outward opening injection valve, a high amount of force is required to keep the valve closed against the high fuel pressure within the injection valve body.

Additionally, there is only a small window of time during which the fuel can be injected. For example, at 4500 revolutions per minute (RPM), at full load, all of the fuel is preferably injected in less than 2–3 milliseconds.

Nearly all known direct fuel injection systems in internal combustion engines have been hydraulically actuated. These systems rely on a hydraulic fluid to provide the force that is needed to open an injection valve (or valves, when the engine comprises a plurality of combustion chambers). Accordingly, at typical engine operating speeds, hydraulically actuated injectors rely on rapid changes in the hydraulic fluid pressure to open and close the injection valve(s). An injection valve is typically opened by increasing the hydraulic fluid pressure and closed by reducing the hydraulic fluid pressure, such that the opening force applied to the injection valve is reduced, causing the valve to close. However, in the context of a conventional gaseous injection valve, hydraulic operation presents several drawbacks, including:

- the need for additional hydraulic hardware such as a hydraulic pump, valves, and a reservoir for the hydraulic fluid;
- the need for a seal to be established between the variable pressure hydraulic fluid and the high pressure gaseous fuel;
- increased bulkiness of the injection valve assembly because of the additional hardware requirements; and
- delayed response of the system caused by time delays associated with the dynamic flow of the hydraulic fluid, the actuation of the electronic hydraulic valve hardware and the movement of the needle that controls gas flow from the injection valve.

Moreover, the degree of controllability of the movement of the injection valve is low when the motive force is provided by a pressurized fluid rather than by a directly controllable source. In this respect, it is difficult to control lift, resulting in limited lift control capabilities when using hydraulically actuated injection valve with a double-spring configuration. Therefore, it is desirable to avoid the use of hydraulics to operate gaseous fuel injectors, particularly for high-speed engines. "Lift" in the context of injection valves is defined herein as the displacement of the valve needle or member away from its closed/seated position to its open position.

U.S. Pat. No. 5,779,149 describes an injector using a piezoelectric actuator acting on a hydraulic control valve through the intermediate of a hydraulic amplifier, which serves to amplify the movement of the actuator. The hydraulic control valve allows the main injection valve to open and close to meter the amount of fuel injected.

A problem with employing a piezoelectric or magnetostrictive actuator to operate a control valve, which in turn controls the flow of a hydraulic fluid to operate an injection valve, is that this arrangement requires the intermediate action of a hydraulic fluid. Any delays caused by the displacement of the hydraulic fluid causes delays in the actuation of the injector. Accordingly, there is a need for an injector that is directly actuated by an actuator without an intermediate active hydraulic operator generating any actuating forces. Another disadvantage of active hydraulically operated systems is that a hydraulic fluid needs to be supplied and drained from a hydraulic cylinder. When diesel fuel is the main fuel used by the engine, the diesel fuel may be used as the hydraulic fluid. However, when a gaseous fuel is the engine's main fuel, a separate hydraulic fluid system is needed to operate injectors that rely on hydraulic actuation.

SUMMARY OF THE INVENTION

An injection valve injects fuel into a combustion chamber of an internal combustion engine. The injection valve comprises:

(a) a valve housing comprising:
   a fuel inlet port;
   an interior chamber fluidly connected to the fuel inlet port; and
   a valve seat for cooperating with a valve member to seal the interior chamber from the combustion chamber when the injection valve is closed;
(b) the valve member having one end disposed within the valve housing and an opposite end extendable from the valve seat toward the combustion chamber, wherein the valve member comprises a sealing surface that fluidly seals against the valve seat when the injection valve is closed and that is liftable away from the valve seat when the injection valve is open, wherein valve lift equals the distance traveled by the sealing surface away from the valve seat;
(c) a biasing mechanism associated with the valve member, the biasing mechanism applying a closing force to the valve member when the valve member is in the closed position;
(d) an actuator assembly associated with the valve member, wherein the actuator assembly may be actuated to apply an opening force to the valve member stronger than the closing force, for moving the valve member to the open position; and
(e) a hydraulic link assembly comprising a passive hydraulic link having a hydraulic fluid thickness through which the opening and closing forces are transmitted, whereby the hydraulic fluid acts substantially as a solid with the thickness being substantially constant while the actuator assembly is actuated and wherein the thickness of the hydraulic link is adjustable while the actuator assembly is not actuated in response to changes in the dimensional relationship between components of the injection valve to maintain a desired valve lift upon actuation of the actuator assembly.

In a preferred embodiment, the thickness of the hydraulic link is auto-adjustable in response to changes in the dimensional relationship caused by differential thermal expansion, and/or wear to components of the injection valve. The hydraulic link assembly preferably comprises a fluidly sealed hydraulic cylinder that is fluidly sealed from the interior chamber. The hydraulic link assembly comprises a piston and hydraulic fluid disposed within the hydraulic cylinder. The hydraulic fluid is preferably a liquid such as, for example motor oil or grease. The piston may be an integral part of the valve member.

In a preferred injection valve the actuator assembly comprises a dimensionally responsive member. The dimensionally responsive member can be formed from a magnetostrictive material. The preferred magnetostrictive material comprises a metal alloy comprising terbium, dysprosium and iron. The preferred actuator assembly further comprises an electric coil disposed in an annular space around the dimensionally responsive member and a flux tube disposed in an annular space around the electric coil. The actuator assembly is preferably disposed within the interior chamber. The dimensionally responsive member can also be formed from a piezoelectric material. A preferred injection valve further comprises a compression spring member for applying a compressive force to the dimensionally responsive member.

In one embodiment, the fuel inlet is positioned so that fuel enters the valve housing and passes through the actuator and hydraulic link assemblies in the interior chamber. In this embodiment, the flow of fuel over these assemblies helps to remove heat generated by the activation of the actuator and reduces the effect of differential temperatures within the injection valve. In another embodiment, the fuel inlet is positioned near the valve tip so that the fuel flowing through the injection valve does not come into contact with the actuator assembly. This embodiment simplifies the construction of the actuator and hydraulic link assemblies since there is no need to provide fluid passages for the fuel to flow to the valve tip.

In a preferred injection valve, the lift is controllable by varying at least one of the electric current, the electric voltage and the magnetic field imposed upon the dimensionally responsive member. The valve member is preferably controllable such that the valve member moves between the open and closed positions in less than about 200 microseconds.

The injection valve preferably further comprises a biasing mechanism for applying a compressive force to the dimensionally responsive member. The biasing mechanism preferably comprises a spring. The spring preferably comprises at least one disc spring.

In a preferred injection valve, the fuel is gaseous and the hydraulic fluid is a liquid. The preferred hydraulic fluid is a liquid selected from the group consisting of motor oil and grease.

The present injection valve is particularly suited for injecting a gaseous fuel because the ability to modulate the movement of the valve member may be beneficially used to slow down the closing action of the valve member to reduce impact upon closing. When a liquid fuel is injected, the closing impact is dampened by the displacement of the thin liquid fuel layer, which is considerably denser than gaseous fuels. When the fuel is a gaseous fuel, it can be injected into the combustion chamber at a pressure greater than about 2000 psi (about 13.8 MPa).

While the hydraulic link in the present injection valve is designed to compensate for changes in the dimensional relationships between valve components, including changes caused by differential thermal expansion, the demands placed upon the hydraulic link may be reduced by the selection of materials for the valve components that have similar thermal expansion coefficients. In this regard, the valve housing, valve member and actuator assembly are preferably selected from materials having thermal expansion coefficients sufficiently compatible such that changes in the dimensional relationship between the components caused by changes in temperature are reduced.

A magnetostrictive material that is suitable for use in the present injection valve comprises a material known as ETREMA Terfenol-D® magnetostrictive alloy that is available from Etrema Products Inc. ETREMA Terfenol-D® magnetostrictive alloy is a metal alloy composed of terbium, dysprosium and iron.

In a preferred embodiment, the valve member, actuated by an actuator assembly that includes a dimensionally responsive member, is controllable to move between the closed and open positions in less than about 200 microseconds.

To improve the range of valve lift for a given length of the dimensionally responsive member, a compressive force may be applied to the dimensionally responsive member. By pre-loading the dimensionally responsive member, net displacement may be increased per respective unit of applied magnetic field (in the case of a dimensionally responsive member formed of magnetostrictive material) or applied voltage (in the case of a dimensionally responsive member formed of piezoelectric material). Accordingly, a biasing mechanism may be employed for applying a compressive force to pre-load the dimensionally responsive member. The biasing member preferably comprises at least one spring, most preferably at least one disc spring (also known as a Belleville spring or Belleville washer).

The injection valve housing may comprise a plurality of parts that are joined with each other to provide a fluidly sealed body. For example, the valve housing may comprise a hollow main housing with a removable valve cap that allows access to the valve components disposed within the main housing. The valve housing may further comprise a separate valve tip so that it is replaceable when worn. In addition, the valve tip may be designed so that it is the only portion of the valve body that is directly exposed to the interior of the combustion chamber. In this case the valve tip may be made from a material that will provide greater durability when directly exposed to the conditions that might be expected within a combustion chamber.

A preferred fuel injection valve for injecting fuel into a combustion chamber of an internal combustion engine comprises:

(a) a valve housing comprising:
   a fuel inlet port;
   an interior chamber fluidly connected to the fuel inlet port;
   a valve seat provided on an end of the housing that faces the combustion chamber;
(b) a valve member comprising a shaft portion having a first end to which a circular head is transversely mounted wherein the head provides an annular sealing surface that faces the valve seat, and a second end of the shaft is associated with a piston portion, the valve member movable between a closed position at which the sealing surface contacts the valve seat to fluidly seal the interior chamber from the combustion chamber, and an open position at which the sealing surface is spaced apart from the valve seat whereby the interior chamber is fluidly connected with combustion chamber, wherein valve lift equals distance traveled by the sealing surface away from the valve seat;
(c) a biasing mechanism associated with the piston portion of the valve member, the biasing mechanism applying a closing force to the valve member when the valve member is in the closed position;
(d) an actuator assembly for applying an opening force to the valve member that is stronger than the closing force, for moving the valve member to the open position, the actuator assembly comprising a member having dimensional responsiveness to the imposition of at least one of an electric current, an electric voltage and a magnetic field, the dimensionally responsive member disposed between a fixed pole maintained in a fixed position relative to the valve housing and a sliding pole, the sliding pole being displaceable by expansion of the dimensionally responsive member; and
(e) a hydraulic link assembly comprising a fluidly sealed hydraulic cylinder disposed about the piston portion of the valve member, a hydraulic fluid disposed within the hydraulic cylinder, wherein the opening and closing forces applied to the valve member are transmitted through a thickness of the hydraulic fluid whereby the hydraulic fluid acts as a hydraulic link and the thickness is automatically adjustable in response to changes in the dimensional relationship between components of the injection valve to maintain a desired valve lift upon actuation of the actuator assembly.

A method of using a shaped waveform to control electric current to actuate an injection valve for an internal combustion engine employs a dimensionally responsive actuator assembly comprising at least one of a magnetostrictive and a piezoelectric material, and a controller to govern valve lift and duration according to values predetermined for engine load demands within the operating range of the engine by the controller controlling current and voltage directed to the actuator assembly. The method comprises, for each injection event:

(a) initiating an injection event by rapidly increasing current to a magnitude that is known to correspond to a desired lift by applying high frequency voltage cycles and in each cycle maintaining a net positive voltage;

(b) maintaining a current to control the desired lift for a duration predetermined by the controller; and (c) concluding an injection event by decreasing current until it is reduced to zero amps by applying high frequency voltage cycles and in each cycle maintaining a net negative voltage.

In a preferred shaped waveform method, the step of initiating an injection event further comprises initially increasing current to a spike value higher than the value for the desired lift to rapidly open the valve and then reducing current to the value to cause the desired lift. The spike value is preferably up to about an order of magnitude higher than the value needed to cause the desired lift. The preferred method further comprises applying high frequency voltage cycles between offsetting positive and negative voltages to generate a current of close to zero amps immediately prior to an injection event. The time to open the valve from a closed position to the desired lift is less than about 175 microseconds, more preferably less than about 100 microseconds. More typically, however, the time needed to move the valve member between the closed position and the desired open position may be as short as about 250 microseconds.

A method of operating a fuel injection valve for an internal combustion engine, in which the injection valve has a longitudinal axis, comprises:

(a) actuating a dimensionally responsive member comprising at least one of a magnetostrictive material and a piezoelectric material, the dimensionally responsive member expanding in length in the direction of the longitudinal axis upon actuation of the actuator;

(b) transferring movement caused by the actuated dimensionally responsive member through a passive hydraulic link to cause a corresponding movement of a valve member to open the valve by lifting the valve member away from a valve seat and compressing a biasing mechanism that biases the valve in a closed position, the passive hydraulic link comprising a hydraulic cylinder which houses a piston and is filled with a hydraulic fluid, wherein the hydraulic fluid forms a layer between the piston and a cylinder head and because of the short duration that the valve is open, the hydraulic fluid does not have time to flow from one side of the piston to the other side and while the injection valve is open, the layer of hydraulic fluid acts as an incompressible solid so that movement caused by the actuation of the dimensionally responsive member is transmitted through the fluid layer;

(c) deactuating the dimensionally responsive member to contract the length of the dimensionally responsive member to unload the biasing mechanism and cause a corresponding movement of the valve member to close the valve;

(d) providing sufficient time between consecutive valve openings to allow at least some of the hydraulic fluid within the passive hydraulic link to flow from one side of the piston to the other side of the piston.

An advantage of the present injection valve is that it may be employed for late-cycle high-pressure direct injection of fuels into internal combustion engines. For example, the present injection valve may be used to inject a gaseous fuel into the combustion chamber of an internal combustion engine at pressures of between about 2000 and 5000 psi (about 13.8 and 34.5 MPa). The present injection valve may be employed to introduce liquid fuels into internal combustion engines at even higher pressures.

Still another advantage of the present injection valve is that it provides an injection valve that eliminates the need for an active hydraulic operator and the associated high-pressure hydraulic system for generating the actuation force to actuate the injection valve. Conventional active hydraulic operators are different from the hydraulic link of the present invention, which may be described as a passive hydraulic link because the hydraulic fluid sealed within the hydraulic link assembly merely transmits the actuating forces but is not employed to generate an actuating force for actuating the valve. Rather, the purpose of the hydraulic link is to provide a load path for the opposing actuating forces that originate from at least one spring member and the actuator assembly. A benefit of eliminating the need for a conventional active hydraulic operator is the elimination of the associated active hydraulic systems. Conventional active hydraulic actuators, such as those that employ rapidly increasing and decreasing hydraulic fluid pressure to actuate an injection valve, are connected to a source of high pressure hydraulic fluid and have valves for controlling the flow of hydraulic fluid in and out of the active hydraulic operator. Active hydraulic actuators employ hydraulic fluid that is moved in and out of a hydraulic cylinder and when the hydraulic cylinder is fluidly connected to a source of high pressure hydraulic fluid, the high pressure hydraulic fluid that flows into the hydraulic cylinder generates the actuating force that is used to move the valve member. The actuating force is removed when the hydraulic cylinder is disconnected from the source of high-pressure hydraulic fluid and the hydraulic fluid is drained from the hydraulic cylinder. A disadvantage of active hydraulic actuators of this type is that there is a lag time associated with moving the hydraulic fluid into and out of the hydraulic cylinder.

A further advantage of the passive hydraulic link is that it may be employed to correct for differential thermal expansion, wear and dimensional variability within permitted manufacturing and assembly tolerances. The disclosed passive hydraulic link accomplishes this by auto-adjusting itself in response to these effects by allowing movement of hydraulic fluid between opposite sides of the hydraulic piston. The actuator assembly thus re-zeroes itself to ensure that the desired valve member lift is maintained.

An advantage of employing a directly actuated injection valve is that a shaped control pulse may be employed to control the acceleration and deceleration of the valve member as it moves between the open and closed positions. For example, when a magnetostrictive actuator is employed, the current applied to the electromagnetic coil can be controlled, for example, to reduce the current in a manner that will close the valve gently. Similarly, when a piezoelectric actuator is employed, the voltage applied to the piezoelectric stack can be controlled, for example, to accelerate the opening of the valve by initially providing an over-voltage (that is, a voltage that is higher than the voltage that is needed to provide the necessary displacement). Thus, control pulses may be employed to control the expansion and contraction of magnetostrictive or piezoelectric actuators to control the movement of the valve member. An advantage of controlling the deceleration of the valve member is that the impact of the valve member on the valve seat upon closing can be reduced to reduce the wear on the valve components, thereby improving durability.

Yet another advantage of the present injection valve is that the control pulse may be shaped to provide for partial lifting of the valve member in a repeatable manner. The amount of lift may be controlled by shaping the control pulse to control the amount of electric current or voltage directed to the respective magnetostrictive or piezoelectric actuator assembly.

Still another advantage of the disclosed injection valve is that the actual valve lift is very small (typically much less than 0.1 millimeter), so that compared to valves designed for greater valve lift, to fully open or close the valve, the valve member velocity can be lower resulting in less impact and wear.

These and other advantages are provided by a directly actuated injector as described below.

BRIEF DESCRIPTION OF THE DRAWINGS

In the figures, like reference numerals are used to identify like components in different embodiments.

DETAILED DESCRIPTION OF PREFERRED EMBODIMENT(S)

Figure 1:
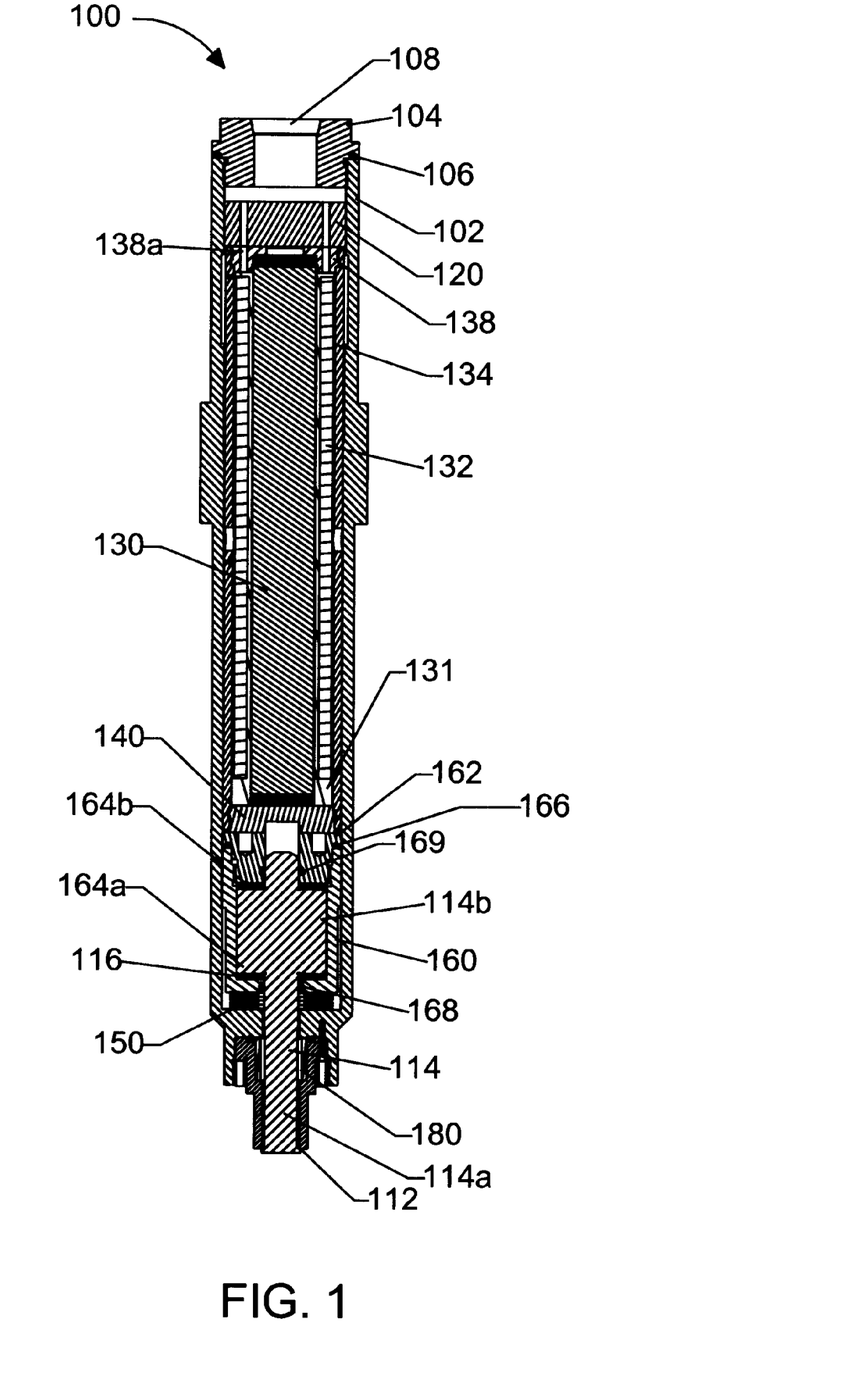
FIG. 1 is a cross-sectional view of a preferred embodiment of a directly actuated fuel injection valve with a passive hydraulic link assembly.
Figure 3:
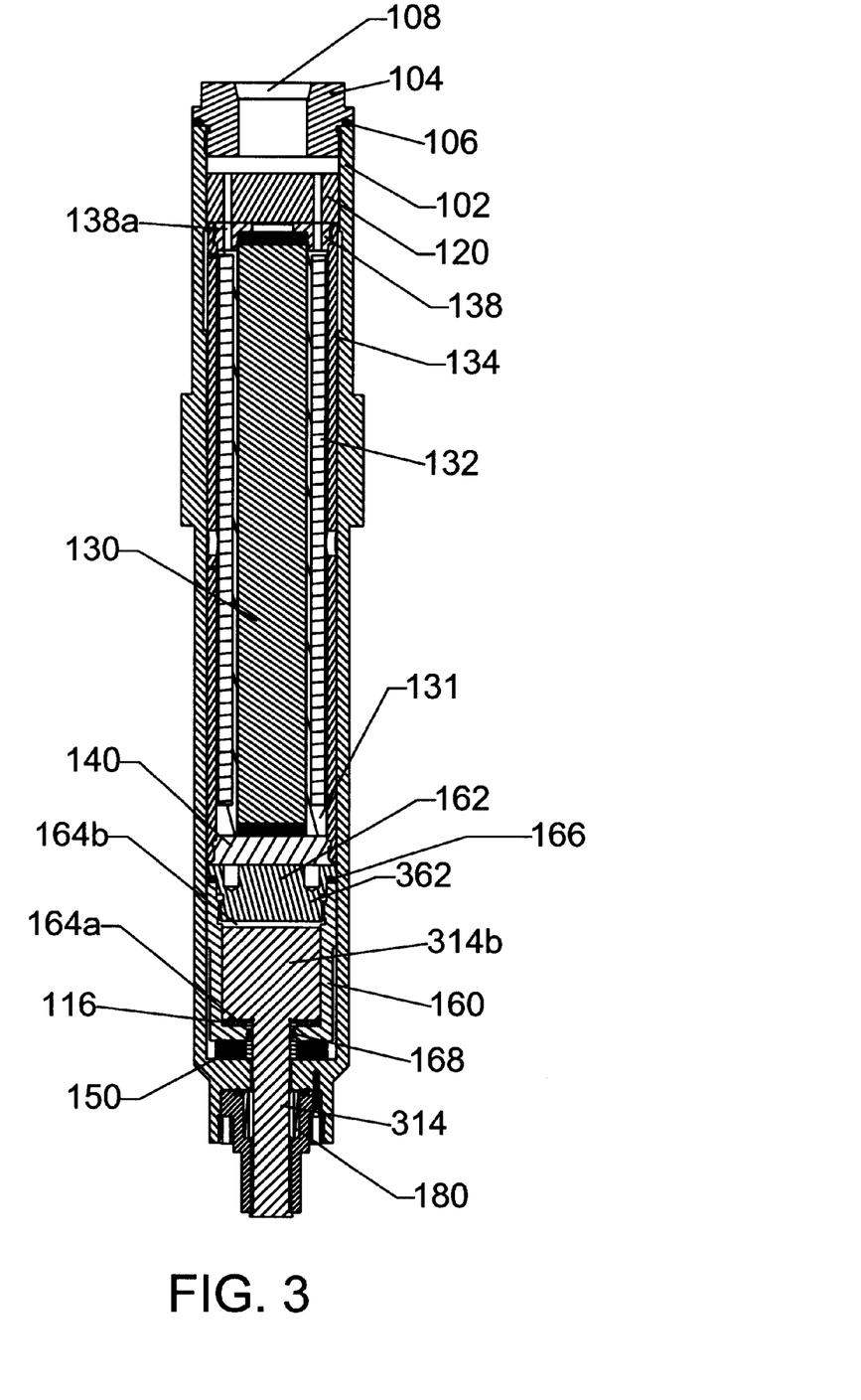
FIG. 3 is a cross-sectional view of another preferred embodiment of a directly actuated fuel injection valve with a different arrangement for the passive hydraulic link assembly.

FIGS. 1 and 3 show two different preferred embodiments of an outward opening directly actuated fuel injection valve for internal combustion engines. Opposed to a needle valve, which employs a needle that is retracted into the valve body to open the valve, an outward opening injection valve extends a valve member outward and away from the valve body to open the valve. To open an outward opening fuel injection valve for injecting fuel into an engine, a valve member is moved away from a valve seat and towards the combustion chamber.

Figure 2:
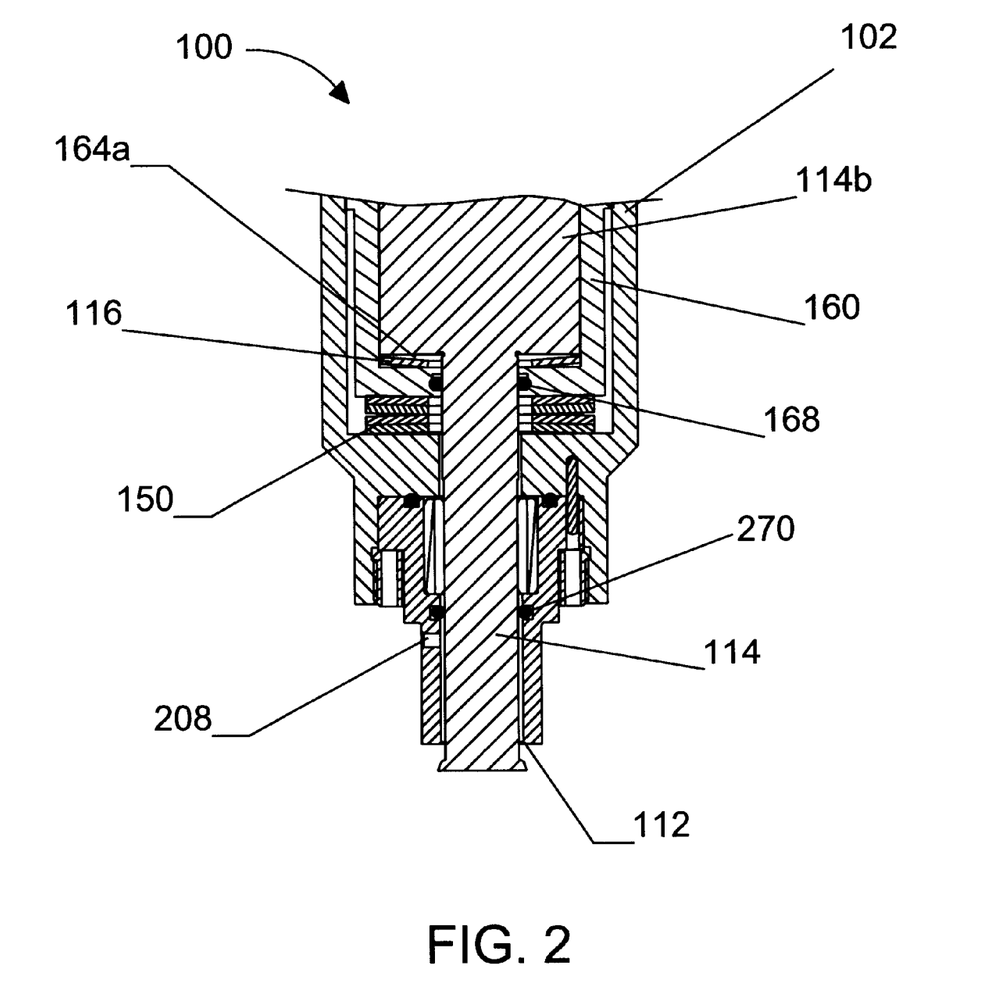
FIG. 2 is an enlarged view of a partial cross-sectional view of the lower portion of a fuel injection valve shown in the open position with an alternate location for the fuel inlet port.

Referring to FIGS. 1 and 2, injection valve 100 includes elongated valve housing 102 that cooperates with valve cap 104 to provide a fluidly sealed valve body. Seal 106 may be employed to ensure that the assembled valve body is fluid-tight. Valve cap 104 comprises inlet port 108 through which fuel enters the valve body. Valve housing 102 further comprises valve seat 112, which is better shown in FIG. 2, which shows an injection valve in the open position.

The figures are schematic representations of preferred embodiments of fuel injection valves for internal combustion engines. However, those skilled in the technology involved here will recognize that the figures are not construction drawings and are not drawn to scale. For example, valve housing 102 is shown as a single element, but for manufacturing purposes, valve housing 102 may be constructed from several pieces. In the figures, the sizes of some components have also been exaggerated to better illustrate certain elements of the apparatus.

The enlarged view of FIG. 2 also shows how valve seat 112 is angled to form a cone-shaped surface and cooperates with the angled sealing surface of valve member 114 to provide a fluid tight seal when the two surfaces are pressed into contact. In addition to providing a desirable sealing arrangement, valve seat 112 and the sealing surface of valve member 114 are angled to guide the direction in which the fuel is injected into the combustion chamber. An advantage of this arrangement is that it allows an unbroken conical sheet of fuel to be injected which provides a continuous surface for the combustion flame. Another advantage of an outward opening injection valve is that when the valve is closed, there is less concern about combustion products fouling or clogging the injection valve because unlike a needle valve there are no exposed nozzle holes.

Figure 2A:
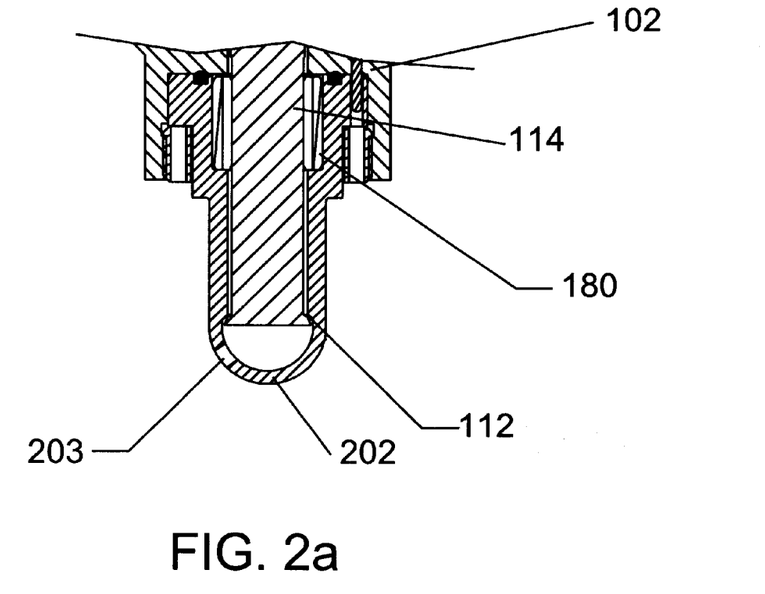
FIG. 2a is a partial cross-sectional view of an embodiment of a nozzle tip for an injection valve.

Valve housing 102 may further comprise features for influencing how the fuel is introduced into the combustion chamber. For example, FIG. 2a shows an embodiment of valve housing 102 that comprises nozzle tip 202 below where valve member 114 seats against valve seat 112. Nozzle tip 202 provides a chamber that is connected to the combustion chamber by nozzle ports or orifices 203. In this embodiment the chamber and orifices 203 may be advantageously sized to slow down the fuel injection velocity to improve ignitability.

Figure 2B:
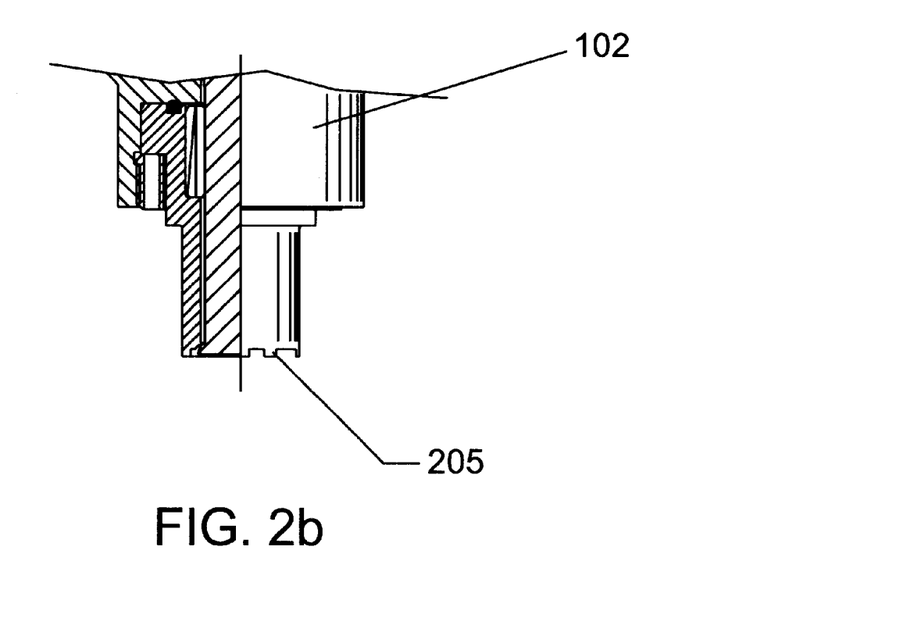
FIG. 2b is a partial side elevation view of an embodiment of a nozzle tip for an injection valve.

In yet another embodiment, valve housing 102 may further comprise an injection tip that has projections 205 as shown in FIG. 2b, which serve to provide breaks in the conical sheet of fuel that is injected when the injection valve is opened. Persons skilled in the technology involved here will recognize that the present invention can be combined with other valve tip configurations. The preferred valve tip configuration may depend upon other features of the engine such as, for example, the shape of the piston bowl and the size and operating conditions of the engine.

Valve Member

With reference to FIG. 1, valve member 114 is disposed within the interior of valve housing 102 and extends through an opening in the tip of valve housing 102. The sealing surface of valve member 114 contacts valve seat 112 to close injection valve 100 by preventing fuel from passing beyond valve seat 112 and into the combustion chamber. In the embodiment of FIG. 1, valve member 114 comprises valve stem 114a, which moves into the open position by moving outward away from the valve body to lift away from valve seat 112. Since the valve lift is generally small (for example, about 65 micrometers), the diameter of valve stem 114a and the size of the annular opening around valve stem 114a are selected to ensure sufficient flow capacity through the injection valve since flow area (A) is proportional to valve stem diameter. Hence, a small lift can be compensated for by a larger diameter. In the preferred embodiment illustrated by FIG. 1 valve member 114 further comprises an integral piston 114b. In another embodiment (not shown) a separate piston member may cooperate with valve member 114 to provide the same effect.

Spring Assembly

A spring assembly biases valve member 114 in the closed position. In a preferred arrangement, the spring assembly comprises at least one valve spring 116 for providing a closing force to valve member 114. With reference to the embodiment of FIG. 1, valve spring 116 is shown as a disc or washer spring. A different type of spring such as a coil spring could be used instead. Pre-load plate 120 is used to apply a pre-load to valve spring 116 so that valve 100 is biased in the closed position. Valve spring 116 should provide a closing force to counter the opposing opening forces generated by the high pressure of the fuel directed to the interior of the sealed valve body. In the arrangement shown in FIG. 1, respective threaded surfaces join pre-load plate 120 to valve housing 102. As is known in the art, after pre-load plate 120 has been rotated to compress valve spring 116 to provide the desired pre-load force to valve spring 116, pre-load plate 120 may be held in position by means of a locking nut (not shown).

Actuator Assembly

An actuator assembly may be actuated to provide an opening force that is opposite and greater than the closing force provided by the spring assembly. In the embodiment illustrated in FIG. 1, the actuator assembly comprises a member that expands or contracts in the direction of the longitudinal axis of valve housing 102 when the member is exposed to a magnetic field or subjected to an electric voltage, such as, for example, a magnetostrictive material or a piezoelectric stack, respectively.

In the embodiment illustrated by FIG. 1, the actuator assembly is a magnetostrictive actuator that comprises a solid magnetostrictive member 130, with bobbin 131, electric coil 132, and flux tube 134 disposed in the annular space between magnetostrictive member 130 and valve housing 102. As shown in FIG. 1, coil 132 is wound around bobbin 131 and flux tube 134 surrounds bobbin 131 and electric coil 132. Flux tube 134 may be made from common carbon steel with a lengthwise slit to break eddy currents. An electric current is supplied to electric coil 132 through electric leads (not shown). When an electric current is applied to electric coil 132 a magnetic flux develops that flows through magnetostrictive member 130, fixed pole 138, sliding pole 140, and flux tube 134. Poles 138 and 140 are made from a suitable material such as carbon steel (for example CS1018) or steel that has a low magnetic hysteresis. Fixed pole 138 is held in a "fixed" position between pre-load plate 120 and end faces of magnetostrictive member 130, bobbin 131 and flux tube 134. Accordingly, when the actuator assembly is actuated and magnetostrictive member 130 grows in length, sliding pole 140 is pushed towards valve member 114 to providing a force for opening injection valve 100.

In another preferred embodiment (not illustrated), flux tube 134 may be integrated with valve housing 102. That is, valve housing 102 could be constructed from a magnetically permeable material that is suitable both structurally and for acting as a flux path. For example, many steels are suitable as materials for housing 102. Stainless steels may be employed but more preferably, common carbon steels are better suited because of material hardness properties and durability. Similarly, fixed pole 138 could also be integrated with pre-load plate 120. Those skilled in the technology involved here will understand that such components can be advantageously integrated without departing from the spirit and scope of the present invention. An advantage of integration, for example, is the efficiencies and reduced costs of manufacturing devices comprising less parts.

An advantage of the preferred embodiments is that magnetostrictive member 130 can be made from a solid cylindrical rod of magnetostrictive material, which is easier and less expensive to manufacture compared to hollow tubular forms.

A pre-compression force is preferably applied to magnetostrictive member 130 to amplify the magnitude of expansion when a magnetic field is applied. Pre-compression of magnetostrictive member 130 increases the net displacement per unit of applied magnetic field. Similarly, when a piezoelectric member is substituted for magnetostrictive member 130, pre-compression increases the net displacement of the piezoelectric member per unit of applied electric voltage. A spring, such as, for example, disc spring 150 may be employed to provide the pre-compression force. Alternative compression elements may be employed in place of disc spring 150 to provide the pre-compression force, such as, for example, a coil spring or another type of spring with the same spring force. When a pre-compression force of, for example, about 1000 psi (about 6.9 MPa) is employed, the actuator's displacement can increase to about 0.13% of the total length of magnetostrictive member 130. However, the amount of displacement may decline as a function of increasing temperature. For example, at typical reciprocating engine cylinder head temperatures the actual displacement may be about 0.065% of the length of pre-compressed magnetostrictive member 130.

The dimensions of magnetostrictive member 130 are dictated by the requirements of injection valve 100. For example, if injection valve 100 is designed to provide a lift of at least about 65 $\mu$m, magnetostrictive member 130 is sized to have a length of at least about 100 mm. Additionally, the transverse cross-sectional area of cylindrical magnetostrictive member 130 is selected to provide sufficient force to overcome all of the opposing forces that hold injection valve 100 in the closed position. If the cross-sectional area of cylindrical magnetostrictive member 130 is not sufficient, the opposing forces can reduce or prevent longitudinal displacement of magnetostrictive member 130, even when electric coil 132 is fully energized. This mode is known as the "blocked force" mode. Accordingly, the magnitude of the closing forces acting on valve member 114 dictate the minimum cross sectional area of magnetostrictive member 130.

While FIG. 1 shows magnetostrictive member 130, electric coil 132, and flux tube 134 could be replaced with a piezoelectric stack (not shown). Electrical leads could be employed to direct an electric voltage to the piezoelectric stack. When an electric voltage is applied to a piezoelectric stack, the stack expands and develops a motive force for opening injection valve 100. Accordingly, the configuration of the present injection valve is essentially the same for magnetostrictive and piezoelectric actuators.

Hydraulic Link Assembly

The opening force generated by the actuator assembly is transmitted to valve member 114 through a hydraulic link assembly. The hydraulic link assembly comprises hydraulic cylinder 160, which is disposed in close-fitting relationship around hydraulic piston 114b, which is movable in the longitudinal direction within cylinder 160. As mentioned above, in the embodiment of FIG. 1, hydraulic piston 114b is preferably an integral part of valve member 114 and the sidewall of cylinder 160 helps to guide the movement of valve member 114 in the longitudinal direction. A viscous hydraulic fluid is sealed inside hydraulic cylinder 160 by cylinder cap 162 and seals 166, 168 and 169. Seals 168 and 169 permit valve member 114 to move relative to cylinder 160 and cylinder cap 162, respectively. Known seals may be employed, such as, for example elastomeric O-ring seals, packing, metal seals, or diaphragm/bellow seals.

The diametrical clearance gap between the outside diameter of hydraulic piston 114b and the inside diameter of hydraulic cylinder 160 is extremely small (on the order of 20 to 250 microns). The desired size of the clearance gap is dependent upon several factors such as the viscosity of the chosen hydraulic fluid, the axial length of the piston, and the thickness of the hydraulic fluid above and below the piston. The hydraulic flow in the clearance gap is governed by the Hagen-Poiseuille Flow and the hydraulic fluid and clearance gap are preferably selected so that the flow of hydraulic fluid through the gap is insignificant during the time span of fuel injection events when an opening force is transmitted through the hydraulic fluid. Furthermore, the hydraulic fluid preferably has a sufficiently high viscosity and bulk modulus so that it acts as an incompressible solid when actuation of the actuator assembly causes a valve opening force to be quickly transmitted through the hydraulic fluid between the bottom of cylinder 160 and hydraulic piston 114b. For consistency of operation, the hydraulic fluid is also preferably an extremely stable fluid that maintains its desired properties over a wide range of temperatures (that is, within the expected operating temperatures inside cylinder 160). Suitable hydraulic fluids are, for example, conventional motor oil, such as grade 15W40, or synthetic lubricants such as DuPont® Krytox® grease which is available in a range of viscosities. Krytox® is a perfluoropolyether (PFPE) synthetic lubricant that may be mixed with a thickener to form a grease. These types of hydraulic fluids also help to lubricate seals 168 and 169. Different injection valves may have different sized hydraulic pistons and clearance gaps, so the hydraulic fluid may be selected with consideration to the characteristics of an individual injection valve design.

When injection valve 100 is closed and at rest, the closing force is transmitted through the hydraulic fluid held between cylinder cap 162 and hydraulic piston 114b. Typically, during engine operation, injection valve 100 is closed most of the time (normally over 90% of the time). Accordingly, there is enough time between injection events for the hydraulic fluid to redistribute itself by flowing through the clearance gap so that hydraulic cylinder 160 moves relative to piston 114b to automatically "re-zero" itself. The initial zero-position is the position of hydraulic piston 114b within hydraulic cylinder 160 after assembly of injection valve 100. The initial zero position may not be the same for all injectors due to slight variations in the length of components within manufacturing tolerances. Also, during operation, the zero-position auto-adjusts in response to changes in the dimensional relationship between components, caused by, for example, component wear or the effects of differential thermal expansion.

Differential thermal expansion or contraction may be caused by differences in thermal expansion coefficients or uneven heat distribution between the components. Even though the components of injection valve 100, such as magnetostrictive member 130, valve member 114, and valve housing 102, are designed to be reasonably matched to the thermal expansion rates of the other components, because the valve lift and the displacement of the components that causes such lift are so small, the effects of thermal expansion or contraction should be taken into account to ensure the desired valve lift is achieved. The effects of thermal expansion and contraction may be amplified if the injection valve is exposed to a wide range of temperatures. For injection valves used in vehicles it would not be uncommon to expect a temperature range between −40° C. (in cold climates) and +125° C. (when the engine is running). An uneven temperature distribution may be the result of many factors, including, for example, the influence of (1) heat generated at electric coil 132; (2) magnetic hysteresis in the actuator assembly; and (3) heat transfer from the cylinder head or the combustion chamber via the injection valve tip and valve member 114. If unaccounted for, the total effect of differential thermal expansion or contraction on the displacement of valve member 114 may be greater than the targeted lift.

In summary, the hydraulic link assembly accounts for variations in component dimensions arising from the permitted tolerances in the manufacturing processes and the injection valve assembly methods. Therefore, the hydraulic link assembly reduces manufacturing costs by allowing the injection valve components to be manufactured to less exacting tolerances. In addition, during operation, the hydraulic link assembly auto-adjusts itself between injection events to account for changes in the dimensional relationship between injection valve components that may be caused, for example, by component wear or differential thermal expansion or contraction.

FIG. 2 illustrates an injection valve embodiment that has fuel inlet 208 located in the side of valve housing 102. An advantage of this arrangement is that fluid pathways are not required through the actuator and hydraulic link assemblies, simplifying the construction of these components and reducing the cross-section area needed for the upper valve assembly. Seal 270, shown in FIG. 2, which may be, for example, an o-ring or packing type seal, prevents the high-pressure fuel from entering the portion of the valve body that houses the hydraulic link and actuator assemblies. A guide (not shown in FIG. 2), similar to guide 180 shown in FIG. 1 may also be employed in the embodiment of FIG. 2 to help guide the movement of valve member 114.

FIG. 3 illustrates an injection valve embodiment that employs a valve member 314 that has a T-shaped cross-section. This embodiment operates in substantially the same manner as the embodiment of FIG. 1. One advantage of the embodiment of FIG. 3 is that seal 169 is eliminated. Another advantage is that valve member 314, sliding pole 340, and cylinder cap 362 are simpler shapes and thus easier to manufacture and there are less tolerance fits since there is no stem protruding from hydraulic piston 314b.

SUMMARY OF OPERATION

When injection valve 100 is at rest in the closed position, the closing force that biases valve member 114 against valve seat 112 originates from valve spring 116 and disc spring 150. In the illustrated preferred embodiments, valve spring 116 bears directly against hydraulic piston 114b to transmit a closing force directly to valve member 114. Disc spring 150 bears against hydraulic cylinder 160 and a pre-compression force is transmitted to the actuator assembly through the sliding assembly comprised of hydraulic cylinder 160, cylinder cap 162 and sliding pole 140. Disc spring 150 also applies a closing force to valve member 114 since it applies a force to hydraulic cylinder 160, which supports valve spring 116. It is preferable for the closing force to be provided by a mechanical spring member, such as the illustrated coil spring, so that the failure mode for injection valve 100 will be in the closed position. That is, if the actuating assembly is not energized or fails, injection valve 100 will remain in the closed position.

To initiate an injection event the actuator assembly is energized by directing an electric current to electric coil 132. A magnetic flux develops that flows through magnetostrictive member 130, poles 138 and 140, and flux tube 134. Under the influence of the magnetic field, magnetostrictive member 130 expands in length (in the direction of the magnetic field). Since fixed pole 138 is stationary, magnetostrictive member 130 expands in the direction of hydraulic cylinder 160. An opening force, originating from expanding magnetostrictive member 130 is transmitted through sliding pole 140, cylinder cap 162, hydraulic fluid 164b disposed within the space between cylinder cap 162 and a planar surface of hydraulic piston 114b, and finally, through piston 114b, which in the illustrated embodiments is integral with valve member 114. The opening force is greater than the closing force, which results in the compression of valve spring 116. The displacement of hydraulic cylinder 160 also results in some further compression of disc spring 150.

As previously discussed, because valve actuation occurs suddenly (on the order of 200 μs), hydraulic fluid 164b does not have time to flow through the narrow clearance gap between piston 114b and hydraulic cylinder 160. Instead, hydraulic fluid 164b acts as a solid and transfers the movement of magnetostrictive member 130 to valve member 114 via piston 114b, causing valve member 114 to lift away from valve seat 112. Because injection valve 100 stays open for such a brief period (typically less than 3 milliseconds), as long as the viscosity of hydraulic fluid 164 is properly selected and the clearance gap is suitably sized, the flow of hydraulic fluid 164 through the clearance gap while injection valve 100 is open is insignificant so that any displacement caused by such flow is much less than the total displacement of valve member 114.

The movement of valve member 114 is guided near the valve tip by guide 180. Guide 180 comprises longitudinal grooves or longitudinal bores or slots (not shown) to allow the fuel to pass therethrough and into the valve tip. Valve member 114 is also guided by the cooperating between the side walls of hydraulic piston 114b and the internal walls of hydraulic cylinder 160.

As shown in the embodiment of FIG. 1, fuel inlet 108 is located in cap 104 and fuel flows through the hollow valve body. In the preferred application, the fuel is a gaseous fuel so small gaps between valve components are sufficient to allow the gaseous fuel to flow through the length of the valve body to the opposite end where the fuel is introduced into the engine combustion chamber through the tip of the injection valve. Fuel flow through the valve interior can also be facilitated by providing longitudinal grooves in the side walls of valve components (not shown) and/or holes or slots provided through components (see for example holes 138a through fixed pole 138). Causing the fuel to flow through the interior of the injection valve helps to cool the valve components and remove heat that may be generated in the actuator assembly. When the fuel is used to cool the actuator assembly in this manner, thermal modeling predicts that during normal operation heat generated by the actuator assembly will cause a temperature rise of less than 10° C.

To close injection valve 100, at the end of the injection event, electric coil 132 is deenergized, causing magnetostrictive member 130 to contract. When valve member 114 is moving from the open position to the closed position, the closing force originates from valve spring 116 and disc spring 150. The closing force from valve spring 116 is again transmitted to valve member 114 through hydraulic piston 114b. In the open position, the expanded magnetostrictive member 130 compressed disc spring 150, so upon closing, disc spring 150 de-compresses to push cylinder 160 towards the actuator assembly to compress to magnetostrictive member 130. Disc spring 150 also provides an additional closing force to valve member 114 by generating a closing force that is transmitted from disc spring 150 through hydraulic cylinder 160, valve spring 116 and hydraulic piston 114b.

Once valve member 114 contacts valve seat 112, injection valve 100 is closed. When injection valve 100 is closed, the hydraulic link assembly automatically self-adjustments so that the position of hydraulic cylinder 160 relative to hydraulic piston 114b is corrected to account for the effects of temperature, wear, and any small movements of valve member 114 relative to hydraulic cylinder 160 that may have occurred while valve member 114 was in the open position. Auto-adjustments are accomplished by the migration of hydraulic fluid from chamber 164b on one side of hydraulic piston 114b to chamber 164a on the other side of hydraulic piston 114b, while valve spring 116 and disc spring 150 ensure that the injection valve remains closed with valve member 114 seated against valve seat 112.

Control Strategy

Figure 4:
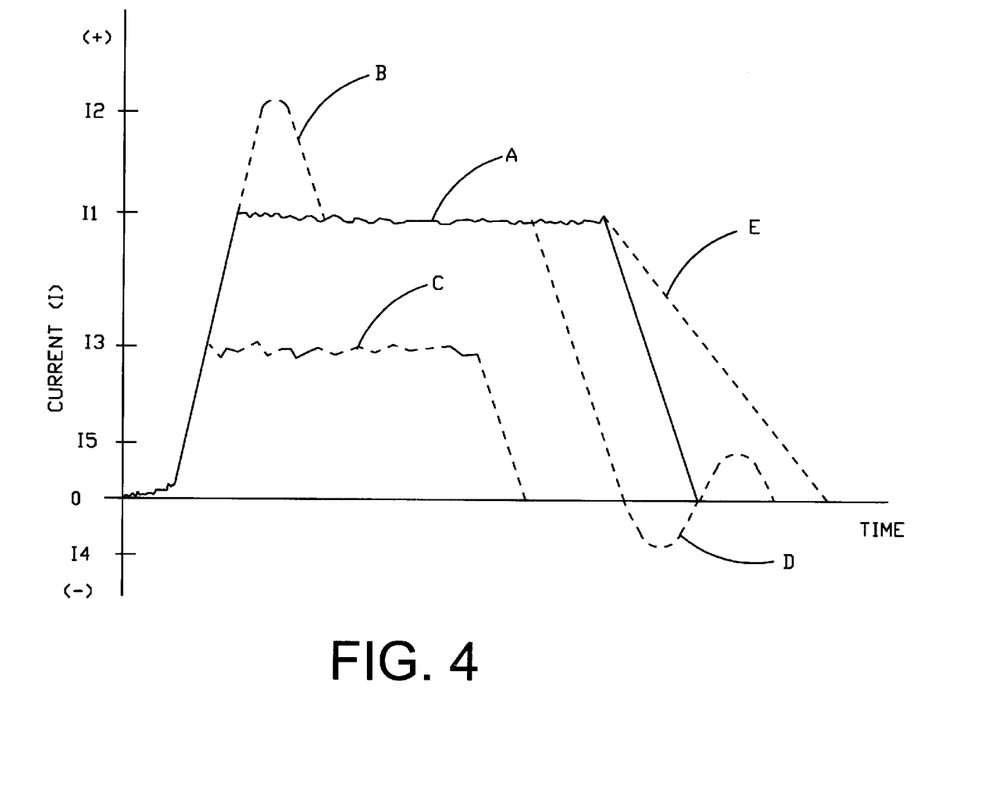
FIG. 4 is a timing diagram for a preferred method of controlling electric current applied to the actuator assembly of a fuel injection valve.

Preferred waveforms representing the amount of electric current delivered to a valve actuator for controlling an injection valve are plotted in FIG. 4. The illustrated waveform shows that the control pulse may employ several features to control the movement of a magnetostrictive or piezoelectric member respectively.

For example, for an actuator employing a magnetostrictive member, an electric current is directed to an electric coil that is used to actuate the magnetostrictive member. The strength of the magnetic field is directly proportional to the amount of electric current that is directed to the electric coil. To promote fast opening, for a short time immediately prior to an injection event (for example 100 microseconds), a current is preferably initiated by high frequency voltage cycles between substantially equivalent positive and negative voltages. For example, these high voltage cycles may be on the order of 100 kHz.

Waveform A illustrates a preferred pulse shape for an injection event. An injection event is initiated when the valve is opened by rapidly increasing current to $I_1$, which is of a magnitude that is known to correspond to a desired lift. When the valve is opening, the high frequency voltage cycles continue between positive and negative voltages but a net positive voltage. Once the desired valve lift is attained, the current is maintained at I1 to maintain the valve lift for a duration predetermined by a controller. The controller is responsive to current engine load and demand.

The injection event is concluded by decreasing current until it is reduced substantially to zero amps by applying high frequency voltage cycles and in each cycle maintaining the negative voltage for a longer time than the positive voltage.

As shown by the dashed lines in FIG. 4, the shape of the waveform may be controlled to achieve desired effects. For example, dashed waveform B shows that upon initiating the injection event, to further accelerate valve opening and introduction of the fuel, the current may be initially increased to $I_2$ which is much higher than the magnitude needed to provide the desired lift. To conserve energy and to maintain the desired lift during the duration of the injection event, the current is later lowered to $I_1$. In this example, current $I_1$ has a value corresponding to the current known to maintain the desired lift.

Waveform C shows that different amounts of valve lift can be achieved by changing the magnitude of the current maintained during the injection event. Waveform C maintains the current at I3 to produce a lower lift to inject a smaller amount of fuel compared to the injection event of waveform A. Waveform C also shows an injection event with a shorter duration compared to the injection event that would be produced by waveform A.

Dashed line D shows that the shape of the waveform can be manipulated to influence the movement of the valve member. In this example the current is momentarily made negative to $I_4$ to accelerate the valve closing and then made momentarily positive again to $I_5$ to slow down the valve member to reduce impact and wear on the valve member and valve seat. The current could also be kept positive (that is $I_4$ equals zero) and current could be momentarily raised to $I_5$ to slow down the valve member before it contacts the valve seat. Dashed line E also shows that valve closing impact and wear to the valve seat and valve member can be reduced by slowing the rate at which the current is reduced to zero.

Persons skilled in the technology involved here will recognize that the time to open or close the injection valve may be decreased by increasing the slope of the control waveform, or increased, by decreasing the slope of the waveform. In summary, the shape of the control waveform may be manipulated to produce the desired effects on the speed of the valve member movement and its displacement with respect to the valve seat (to control lift).

The time span for the waveforms of FIG. 4 may be in the range of 100 to 5000 microseconds, and typically between 250 and 2000 microseconds for the majority of injection events.

The combination of the above described directly actuated injection valve and control strategy provides several benefits, including:

elimination of the hydraulic fluid supply system that is needed by conventional hydraulically actuated injection valves. This simplifies injection valve construction, for example, by eliminating the need for hydraulic fluid supply and return passages and the hydraulic fluid control valves that are employed by conventional hydraulically actuated injection valves.

automatic compensation for differential thermal expansion within the injection valve, for wear due to prolonged operation, and for small differences caused by limitations in manufacturing tolerances.

an apparatus that permits the use of a control strategy that can throttle fuel flow and reduce valve seat wear. The ability to control the lift displacement permits reduced injection at lower loads and reduced pre-mixed burning. For example, using a magnetostrictive or piezoelectric actuator, the valve member movement can be controlled between about 10% and 100%. For lower load conditions it is important to be able to reduce the flow of fuel into the combustion chamber, since excess fuel may not be combusted, resulting in lower operating efficiency and higher emissions.

improved manufacturability is made possible by the use of axisymmetric cylindrical parts and few tight tolerances between the injection valve components.

valve operation is improved since the actuating assembly permits greater control of the valve member. For example, the injection valve may be used to inject a gaseous or liquid fuel. When the fuel is gaseous, there is a greater need to slow down the valve member upon closing because there is no liquid fuel to dampen the impact of the valve member on the valve seat.

By shaping the control pulse waveform applied to the actuator it is possible to slow down the closing of the injection valve to reduce impact on the valve member and the valve seat.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. An injection valve for injecting fuel into a combustion chamber of an internal combustion engine, said injection valve comprising:
   (a) a valve housing comprising:
      a fuel inlet port;
      an interior chamber fluidly connected to said fuel inlet port; and
      a valve seat for cooperating with a valve member to seal said interior chamber from said combustion chamber when said injection valve is closed;
   (b) said valve member having one end disposed within said valve housing and an opposite end extendable from said valve seat toward said combustion chamber, wherein said valve member comprises a sealing surface that fluidly seals against said valve seat when said injection valve is closed and that is liftable away from said valve seat when said injection valve is open;
   (c) a biasing mechanism associated with said valve member, said biasing mechanism applying a closing force to said valve member when said valve member is in said closed position;
   (d) an actuator assembly associated with said valve member, wherein said actuator assembly may be actuated to apply an opening force to said valve member stronger than said closing force, for moving said valve member to said open position; and
   (e) a hydraulic link assembly comprising a passive hydraulic link having a hydraulic fluid thickness through which said opening and closing forces are transmitted, whereby said hydraulic fluid acts substantially as a solid with said thickness being substantially constant while said actuator assembly is actuated and wherein said thickness of said hydraulic link is adjustable while said actuator assembly is not actuated in response to changes in the dimensional relationship between components of said injection valve to maintain a desired valve lift upon actuation of said actuator assembly.

2. The injection valve of claim 1 wherein said thickness of said hydraulic link is auto-adjustable while said actuator assembly is not actuated in response to changes in said dimensional relationship caused by differential thermal expansion.

3. The injection valve of claim 2 wherein said thickness of said hydraulic link is auto-adjustable while said actuator assembly is not actuated in response to changes in said dimensional relationship caused by wear to components of said injection valve.

4. The injection valve of claim 1 wherein said hydraulic link assembly comprises a fluidly sealed hydraulic cylinder that is fluidly sealed from said interior chamber, said hydraulic link assembly comprising a piston and said hydraulic fluid is disposed within said hydraulic cylinder.

5. The injection valve of claim 4 wherein said piston is an integral part of said valve member.

6. The injection valve of claim 1 wherein said actuator assembly comprises a dimensionally responsive member.

7. The injection valve of claim 6 wherein said dimensionally responsive member is formed from a magnetostrictive material.

8. The injection valve of claim 7 wherein said magnetostrictive material comprises a metal alloy comprising terbium, dysprosium and iron.

9. The injection valve of claim 7 wherein said actuator assembly further comprises an electric coil disposed in an annular space around said dimensionally responsive member.

10. The injection valve of claim 9 wherein said actuator assembly further comprises a flux tube disposed around said electric coil.

11. The injection valve of claim 10 wherein said a flux tube is disposed in an annular space around said electric coil.

12. The injection valve of claim 10 wherein said actuator assembly is disposed within said interior chamber.

13. The injection valve of claim 6 wherein said dimensionally responsive member is formed from a piezoelectric material.

14. The injection valve of claim 6 further comprising a compression spring member for applying a compressive force to said dimensionally responsive member.

15. The injection valve of claim 1 wherein said fuel inlet port is positioned such that fuel enters said valve housing and passes through said actuator and hydraulic link assemblies.

16. The injection valve of claim 1 wherein said fuel inlet port is positioned near the valve tip such that fuel flowing through said interior chamber does not contact said actuator assembly.

17. The injection valve of claim 6 wherein said actuator assembly is controllable to maintain said desired lift between 10 and 100 percent of maximum lift.

18. The injection valve of claim 17 wherein said lift is controllable by varying at least one of the electric current, the electric voltage and the magnetic field imposed upon said dimensionally responsive member.

19. The injection valve of claim 6 wherein said valve member is controllable such that said valve member moves between said open and closed positions in less than about 200 microseconds.

20. The injection valve of claim 6 further comprising a biasing mechanism for applying a compressive force to said dimensionally responsive member.

21. The injection valve of claim 1 wherein said biasing mechanism comprises a spring.

22. The injection valve of claim 21 wherein said spring comprises at least one disc spring.

23. The injection valve of claim 1 wherein said fuel is a gaseous fuel.

24. The injection valve of claim 23 wherein said hydraulic fluid is a liquid.

25. The injection valve of claim 24 wherein said hydraulic fluid is a liquid selected from the group consisting of motor oil and grease.

26. The injection valve of claim 1 wherein said fuel is injected into said combustion chamber at a pressure greater than about 2000 psi (about 13.8 Mpa).

27. The injection valve of claim 1 wherein said valve housing comprises a plurality of parts which are joined with each other to provide a fluidly sealed body.

28. The injection valve of claim 1 wherein said valve housing, said valve member and said actuator assembly are selected from materials having thermal expansion coefficients sufficiently compatible such that changes in the dimensional relationship between said components caused by changes in temperature are reduced.

29. An injection valve for injecting fuel into a combustion chamber of an internal combustion engine, said injection valve comprising:
- (a) a valve housing comprising:
    a fuel inlet port;
    an interior chamber fluidly connected to said fuel inlet port;
    a valve seat provided on an end of said housing that faces said combustion chamber;
- (b) a valve member comprising a shaft portion having a first end to which a circular head is transversely mounted wherein said head provides an annular sealing surface that faces said valve seat, and a second end of said shaft is associated with a piston portion, said valve member movable between a closed position at which said sealing surface contacts said valve seat to fluidly seal said interior chamber from said combustion chamber, and an open position at which said sealing surface is spaced apart from said valve seat whereby said interior chamber is fluidly connected with combustion chamber;
- (c) a biasing mechanism associated with said piston portion of said valve member, said biasing mechanism applying a closing force to said valve member when said valve member is in said closed position;
- (d) an actuator assembly for applying an opening force to said valve member that is stronger than said closing force, for moving said valve member to said open position, said actuator assembly comprising a member having dimensional responsiveness to the imposition of at least one of an electric current, an electric voltage and a magnetic field, said dimensionally responsive member disposed between a fixed pole maintained in a fixed position relative to said valve housing and a sliding pole, said sliding pole being displaceable by expansion of said dimensionally responsive member; and
- (e) a hydraulic link assembly comprising a fluidly sealed hydraulic cylinder disposed about said piston portion of said valve member, a hydraulic fluid disposed within said hydraulic cylinder, wherein said opening and closing forces applied to said valve member are transmitted through a thickness of said hydraulic fluid whereby said hydraulic fluid acts as a hydraulic link and said thickness is automatically adjustable in response to changes in the dimensional relationship between components of said injection valve to maintain a desired valve lift upon actuation of said actuator assembly.

30. The injection valve of claim 29 wherein said dimensionally responsive member is formed from a magnetostrictive material.

31. The injection valve of claim 30 wherein said magnetostrictive material comprises a metal alloy comprising terbium, dysprosium and iron.

32. The injection valve of claim 30 wherein said actuator assembly further comprises an electric coil disposed in an annular space around said dimensionally responsive member.

33. The injection valve of claim 32 wherein said actuator assembly further comprises a flux tube disposed in an annular space around said electric coil.

34. The injection valve of claim 29 wherein said dimensionally responsive member is formed from a piezoelectric material.

35. The method of claim 29 further comprising applying high frequency voltage cycles between offsetting positive and negative voltages to generate a current of close to zero amps immediately prior to an injection event.

36. The method of claim 29 wherein the time to open said valve from a closed position to said desired lift is less that about 100 microseconds.

37. The injection valve of claim 29 further comprising a compression spring member for applying a compressive force to said dimensionally responsive member.

38. A method of using a shaped waveform to control electric current to actuate an injection valve for an internal combustion engine that employs a dimensionally responsive actuator assembly comprising at least one of a magnetostrictive and a piezoelectric material, and a controller to govern valve lift and duration according to values predetermined for engine load demands within the operating range of said engine by said controller controlling current and voltage directed to said actuator assembly, said method comprising for each injection event:
- (a) initiating an injection event by rapidly increasing current to a magnitude that is known to correspond to a desired lift by applying high frequency voltage cycles and in each cycle maintaining a net positive voltage;
- (b) maintaining a current to control said desired lift for a duration predetermined by said controller; and
- (c) concluding an injection event by decreasing current until it is reduced to zero amps by applying high frequency voltage cycles and in each cycle maintaining a net negative voltage.

39. The method of claim 38 whereby the step of initiating an injection event further comprises initially increasing current to a spike value higher than the value for the desired lift to rapidly open said valve and then reducing current to the value to cause the desired lift.

40. The method of claim 39 wherein said spike value is up to about an order of magnitude higher than the value needed to cause the desired lift.

41. A method of operating a fuel injection valve for an internal combustion engine, said injection valve having a longitudinal axis, said method comprising:
- (a) actuating a dimensionally responsive member comprising at least one of a magnetostrictive material and a piezoelectric material, said dimensionally responsive member expanding in length in the direction of said longitudinal axis upon actuation of said actuator;
- (b) transferring movement caused by said actuated dimensionally responsive member through a passive hydraulic link to cause a corresponding movement of a valve member to open said valve by lifting said valve member away from a valve seat and compressing a biasing mechanism that biases said valve in a closed position, said passive hydraulic link comprising a hydraulic cylinder which houses a piston and is filled with a hydraulic fluid, wherein said hydraulic fluid forms a layer between said piston and a cylinder head and because of the short duration that said valve is open, said hydraulic fluid does not have time to flow from one side of said piston to the other side and while said injection valve is open, said layer of hydraulic fluid acts as an incompressible solid so that movement caused by the actuation of said dimensionally responsive member is transmitted through said fluid layer;
- (c) deactuating said dimensionally responsive member to contract the length of said dimensionally responsive member to unload said biasing mechanism and cause a corresponding movement of said valve member to close said valve;
- (d) providing sufficient time between consecutive valve openings to allow at least some of said hydraulic fluid within said passive hydraulic link to flow from one side of said piston to the other side of said piston.

* * * * *